United States Patent
Park (10) Patent No.: US 8,703,331 B2
(45) Date of Patent: Apr. 22, 2014

(54) SECONDARY BATTERY

(75) Inventor: Yong-Kyun Park, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 0 days.

(21) Appl. No.: 13/450,171

(22) Filed: Apr. 18, 2012

(65) Prior Publication Data

US 2012/0321945 A1    Dec. 20, 2012

(30) Foreign Application Priority Data

Jun. 15, 2011    (KR) .................. 10-2011-0057951

(51) Int. Cl.
- *H01M 4/02* (2006.01)
- *H01M 4/13* (2010.01)
- *H01M 6/48* (2006.01)
- *H01M 10/18* (2006.01)

(52) U.S. Cl.
USPC ........................... 429/211; 429/210; 429/209

(58) Field of Classification Search
None
See application file for complete search history.

(56) References Cited

U.S. PATENT DOCUMENTS

| | | | |
|---|---|---|---|
| 6,136,471 A * | 10/2000 | Yoshida et al. ............ | 429/218.1 |
| 2003/0148187 A1 | 8/2003 | Yamaguchi et al. | |
| 2008/0220329 A1 | 9/2008 | Kojima et al. | |

FOREIGN PATENT DOCUMENTS

| | | | |
|---|---|---|---|
| EP | 2187468 A | | 5/2010 |
| JP | 07302586 | | 11/1995 |
| JP | 11-073947 | * | 3/1999 |
| JP | 11073947 | | 3/1999 |
| KR | 1999-0085207 A | | 12/1999 |
| KR | 1020010095827 | | 11/2001 |
| KR | 1020080015162 | | 2/2008 |
| KR | 2008-0022494 A | | 3/2008 |
| KR | 2010-0043062 A | | 4/2010 |

OTHER PUBLICATIONS

English translation of JP 11-073947.*
Korean Notice of Allowance issued by KIPO on Oct. 8, 2012 in connection with Korean Patent Application Serial No. 10-2011-0057951 and Request for Entry of the Accompanying Office Action attached herewith.

* cited by examiner

*Primary Examiner* — Yoshitoshi Takeuchi
(74) *Attorney, Agent, or Firm* — Robert E. Bushnell, Esq.

(57) ABSTRACT

A secondary battery including an intermediate layer having a pattern formed by carbon and a binder between a substrate and an active material layer and reinforcing adhesion between the substrate and the active material layer. In the intermediate layer, the carbon and the binder in the intermediate layer are adjacent to each other. Therefore, the active material is prevented from being detached from the substrate, thereby improving performance of the secondary battery. A small amount of the binder having strong adhesion is used in the active material slurry, thereby ensuring safety of the battery.

7 Claims, 5 Drawing Sheets

SECONDARY BATTERY

CLAIM OF PRIORITY

This application makes reference to, incorporates the same herein, and claims all benefits accruing under 35 U.S.C. §119 from an application earlier filed in the Korean Intellectual Property Office on the 15 of Jun. 2011 and there duly assigned Serial No. 10-2011-0057951.

BACKGROUND OF THE INVENTION

1. Field of the Invention

The present invention relates to a secondary battery and more particularly, to a secondary battery capable of improving performance of the battery.

2. Description of the Related Art

In general, a secondary battery is a chargeable and dischargeable battery, unlike a primary battery which does not charged.

SUMMARY OF THE INVENTION

The present invention has been made in an effort to provide an improved secondary battery.

In addition, the present invention has been made in an effort to provide a secondary battery including an intermediate layer having a pattern formed by carbon and a binder between a substrate and an active material layer and reinforcing adhesion between the substrate and the active material layer.

Further, the present invention has been made in an effort to provide a secondary battery reducing the amount of a binder mixed in an active material slurry.

An exemplary embodiment of the present invention provides a secondary battery including a substrate, an intermediate layer having carbon and a binder formed on the substrate, and an active material layer formed on the intermediate layer. The carbon and the binder in the intermediate layer are adjacent to each other.

In this case, each of the carbon and the binder in the intermediate layer may form a pattern.

Herein, the carbon and the binder may form a stripe, lattice, or comb shape of pattern.

In addition, the carbon may be any one selected from a group configured by graphite, a graphene nano sheet, and graphene.

Further, the adhesion between the substrate and the active material layer may be in the range of approximately 0.5 gf/mm to approximately 5.0 mm.

In addition, a thickness of the intermediate layer may be in the range of approximately 0.2 μm to approximately 5 μm.

Further, the carbon may include an amorphous region.

In addition, the substrate may include a positive current collector.

Further, the binder may include at least any one selected from a group configured by PVDF (Polyvinylidene Flouride), PI (Polyimide), PAI (Polyamideimide), Chitosane, and SBR (Styrene-Butadiene Rubber).

Another exemplary embodiment of the present invention provides a method of manufacturing a secondary battery including preparing a substrate, coating a carbon solution and a binder solution in a regular pattern on the substrate, and forming an active material layer on the carbon solution and the binder solution.

In this case, in the coating of the carbon solution and the binder solution on the substrate, the carbon solution and the binder solution may be coated by using a screen printing method.

Further, in the coating of the carbon solution and the binder solution on the substrate, the carbon solution and the binder solution may be coated by using a spray coating method.

In addition, in the coating of the carbon solution and the binder solution on the substrate, the carbon solution and the binder solution may be adjacent to each other.

Further, the carbon may be any one selected from a group configured by graphite, a graphene nano sheet, and graphene.

According to the present invention, the adhesion between the substrate and the active material is reinforced, such that the active material is prevented from being detached from the substrate, thereby improving reliability and lifespan of the secondary battery.

Further, according to the present invention, a small amount of the binder is mixed and used in the active material slurry, thereby ensuring safety of the battery.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

The secondary battery includes a positive electrode plate, a negative electrode plate, and an electrode assembly having a laminated or wound separators interposed therebetween. In this case, the positive electrode plate has a structure in which a positive active material is coated on a positive substrate and the negative electrode plate has a structure in which a negative active material is coated on a negative substrate.

Lithium ions move to the positive active material and the negative active material such that charging and discharging of the secondary battery may be performed. However, when adhesion between the positive active material or the negative active material and the substrate is weak, the positive active material or the negative active material may be detached in a manufacturing process of the secondary battery. The detachment of the active material generates defects of a bare cell, and undesirably causing many problems even on performance of the battery and safety of the battery.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the another element or be indirectly on the another element with one or more intervening elements interposed therebetween. Also, when an element is referred to as being "connected to" another element, it can be directly connected to the another element or be indirectly connected to the another element with one or more intervening elements interposed therebetween. Hereinafter, like reference numerals refer to like elements.

In describing the embodiment, well-known functions or constructions will not be described in detail since they may unnecessarily obscure the understanding of the present invention. In addition, it will be appreciated that like reference numerals refer to like elements throughout even though they are shown in different figures. Besides, in the figures, the thickness and sizes of each layer may be exaggerated for convenience of description and clarity and may be different from the actual thickness and size.

Figure 1:
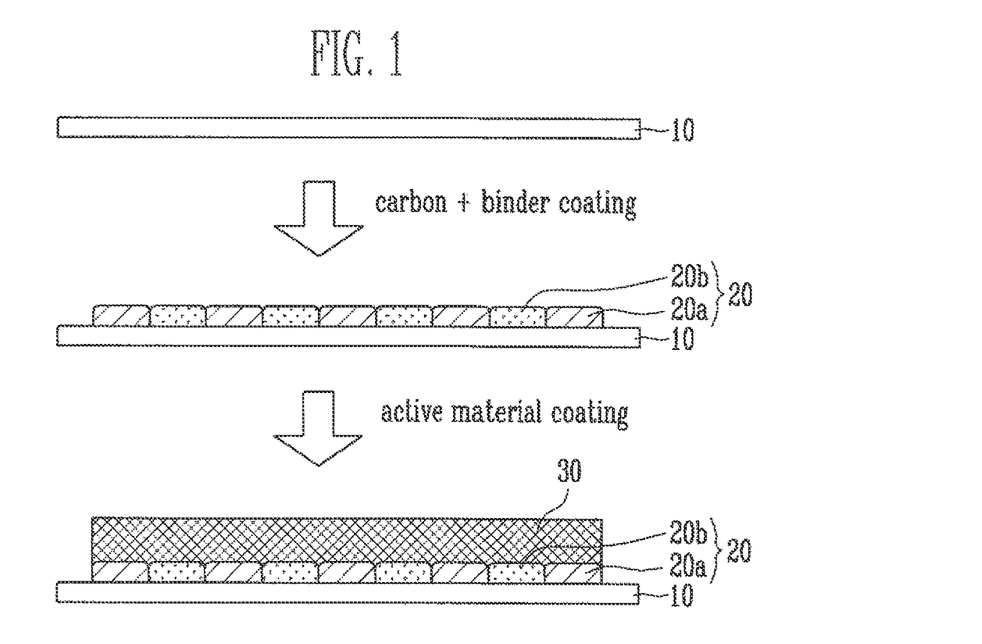
FIG. 1 is a cross sectional view illustrating a process in which an intermediate layer and an active material layer are formed as an embodiment according to the principles of the present invention.

FIG. 1 is a cross sectional view illustrating a process in which an intermediate layer and an active material layer are formed as an embodiment according to the principles of the present invention.

Referring to FIG. 1, a secondary battery constructed as an exemplary embodiment according to the principles of the present invention includes a substrate 10 and an active material layer 30 formed on the substrate 10. In addition, the secondary battery further includes an intermediate layer 20 disposed between the substrate 10 and the active material layer 30. The intermediate layer 20 includes carbon 20a and a binder 20b.

As the exemplary embodiment according to the principles of the present invention, in a process in which the intermediate layer 20 and the active material layer 30 are formed on the substrate 10, the substrate 10 is first prepared. In this case, the substrate 10 may be a positive current collector formed by a conductive metal thin film. In general, the positive current collector may be made of aluminum (Al).

Next, the intermediate layer 20 may be formed by forming the carbon 20a and the binder 20b on the substrate 10. In this case, the carbon 20a and the binder 20b may be adjacent to each other in the intermediate layer 20. That is, the carbon 20a and the binder 20b in the intermediate layer 20 are not mixed and may be thinly coated on the substrate 10 in various patterns. Accordingly, illumination of the intermediate layer 20 is increased, such that a surface area thereof may be increased. That is, a contact area between the intermediate layer 20 and the substrate 10 is increased, such that the adhesion therebetween may be improved and the adhesion between the substrate and the active material layer 30 formed on the intermediate layer 20 may be improved.

Further, the carbon 20a of the intermediate layer 20 may be included in a mixed state of a crystal region and an amorphous region and a function group may be formed in the amorphous region. As a result, in the amorphous region of the carbon 20a, bondability with a function group of the binder 20b may be further increased. Accordingly, the carbon 20a and the binder 20b forming the patterns of the intermediate layer 20 may be further easily formed in one layer.

Herein, the carbon may be any one selected from a group configured by graphite, a graphene nano sheet, graphene. Among them, as compared with the carbon in the graphite form, in the carbon in the graphene form, the amorphous region may be included in a smaller amount.

First, when the carbon is made of the graphite, the graphene nano sheet, or the graphene, conductivity in an electrode plate can be increased and the adhesion between the substrate 10 and the active material layer 30 can be increased. The conductivity of the graphite is excellent and when the graphite is included on the substrate 10, the contact area between the substrate 10 including the graphits and the active material layer 30 is increased as compared with the contact area between the substrate 10 without the graphite and the active material layer 30, such that the conductivity in an electrode plate can be increased and the adhesion in the electrode plate is increased due to the increase of the contact area.

In addition, when the carbon 20a is made of the graphene nano sheet or the graphene in addition to the merits, since crystalizability is excellent as compared with the graphite, the conductivity is more excellent.

Further, the binder may include at least any one selected from a group configured by PVDF (Polyvinylidene Flouride), PI (Polyimide), PAI (Polyamideimide), Chitosane, and SBR (Styrene-Butadiene Rubber).

In addition, a thickness of the intermediate layer may be in the range of approximately 0.2 μm to approximately 5 μm. When the thickness of the intermediate layer is less than 0.2 μm, the adhesion between the active material layer and the substrate of the electrode plate is slight. In addition, when the thickness of the intermediate layer is more than 5 μm, the adhesion between the active material layer and the substrate of the electrode plate is further increased, but the conductivity is decreased.

As such, the active material layer 30 is formed on the substrate 10 with the intermediate layer 20. The active material layer 30 may be formed by using a method of coating the active material slurry on the substrate 10 or forming the active material slurry in a sheet shape, and attach the formed active material slurry on the substrate 10.

The active material layer 30 on the substrate 10 which is used as positive current collector may be formed by using a positive slurry. The positive slurry is formed by mixing a positive active material, a conductive material, and a small amount of positive binder in a solvent. The active material layer 30 may be formed by coating the positive slurry on at least one side of a positive current collector.

Herein, the positive active material is involved in a positive chemical reaction in a lithium secondary battery to generate electrons, and a conductive material may transfer the electrons generated in the positive active material to the positive current collector. In addition, the positive binder bonds the positive active material with the conductive material and may maintain a mechanical strength of a positive electrode plate 11.

As the positive active material, a lithium complex metallic compound such as $LiCoO_2$, $LiMn_2O_4$, $LiNiO_2$, $LiNi_{1-x}Co_xO_2$ ($0<x>1$), $LiMnO_2$ and the like is used, but the present invention is not limited to the materials.

In general, the carbon may be used as a negative active material, but in the present invention, the carbon may be used as an adhesive between the substrate 10 and the active material layer 30. As such, the intermediate layer 20 is formed, such that two layers of the intermediate layer 20 and the active material layer 30 may formed on the substrate 10. Accordingly, resistance of the substrate 10 can be reduced and the adhesion and the electric conductivity can be improved.

Hereinafter, charging and discharging process of the secondary battery will be briefly described. In the charging process in which electrons are provided to a negative electrode of the secondary battery from the charger, lithium ions moves from the positive active material to the negative material. That is, the lithium ions generated from the lithium compound in the positive active material pass through an electrolyte and a separator and is intercalated in the negative active material, such that the charging is performed. In addition, in the discharging process where the electrons are discharged through the negative electrode, the lithium ions intercalated in the negative active material move to the positive active material. That is, the lithium ions are deintercalated from the negative active material to the lithium compound in the positive active material by passing through the electrolyte and the separator, such that the discharge is performed.

As such, the positive active material and the negative active material are significant materials so that the lithium ions move to perform the charge and discharge. Accordingly, the active materials need to have the adhesion with the substrate 10 so as not to be detached from the substrate 10. In the present invention, the intermediate layer 20 configured by including the carbon 20a and the binder 20b is formed between the substrate 10 and the active material layer 30, such that the adhesion between the substrate 10 and the active material layer 30 can be improved.

In addition, the binder is included in the intermediate layer 20, such that deterioration in the performance of the battery can be prevented by using the binder in a known active material slurry. Further, as compared with the case where the binder is included in the active material slurry, when the binder is included in the intermediate layer 20, although the amount of the binder is small, the adhesion between the substrate 10 and the active material layer 30 can be further improved.

Figure 2A:
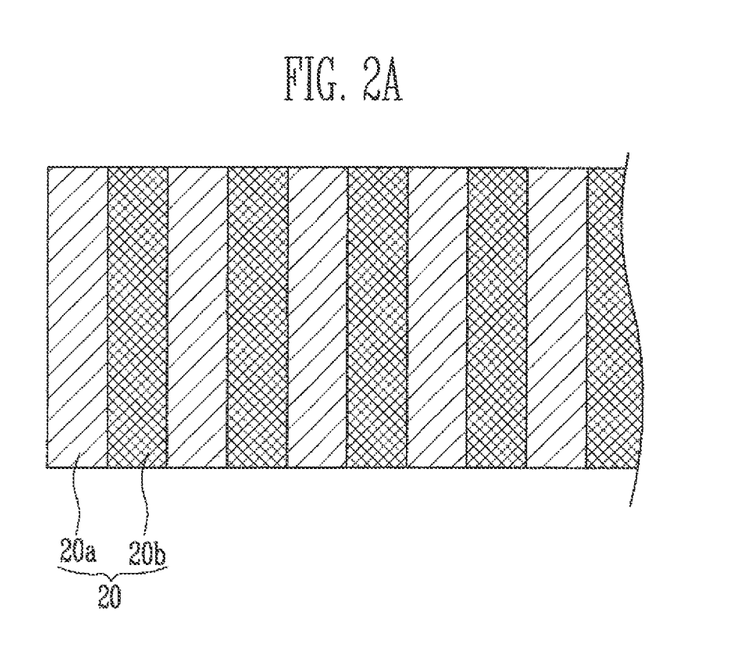
FIG. 2A is a plan view illustrating an intermediate layer having a stripe shape of pattern constructed as an exemplary embodiment according to the principles of the present invention.

FIG. 2A is a plan view illustrating an intermediate layer having a stripe shape of pattern constructed as an exemplary embodiment according to the principles of the present invention.

Referring to FIG. 2A, in the intermediate layer 20 constructed as the exemplary embodiment according to the principles of the present invention, carbons 20a having a stripe shape are formed with a predetermined interval and the binder 20b is formed therebetween. That is, the intermediate layer 20 configured by including the carbon 20a and the binder 20b may form patterns having a stripe shape formed alternately to each other.

Figure 2B:
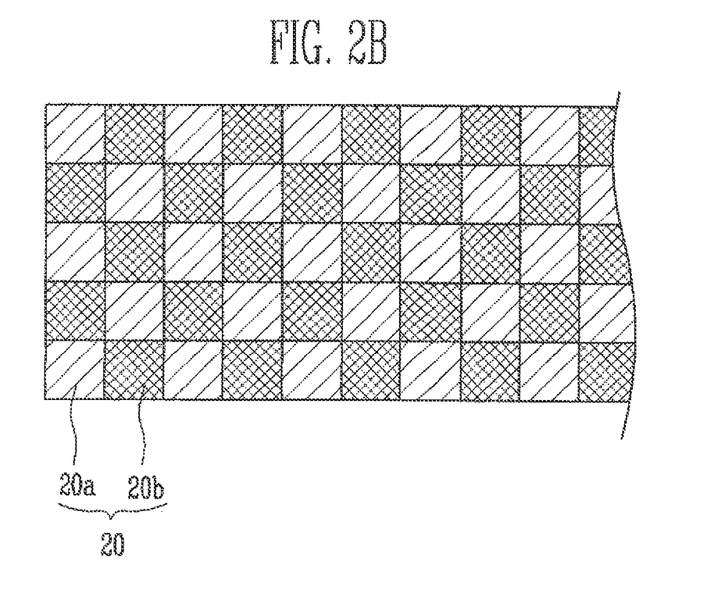
FIG. 2B is a plan view illustrating an intermediate layer having a lattice shape of pattern constructed as another exemplary embodiment according to the principles of the present invention.

FIG. 2B is a plan view illustrating an intermediate layer having a lattice shape of pattern constructed as another exemplary embodiment according to the principles of the present invention.

Referring to FIG. 2B, in the intermediate layer 20 constructed as another exemplary embodiment according to the principles of the present invention, the binder 20b is disposed at the up, down, left, and right of the position where the carbon 20a is formed and the carbon 20a is disposed in a diagonal line. The patterns are repetitively formed and the carbon 20a and the binder 20b may form the lattice shape of patterns.

Figure 2C:
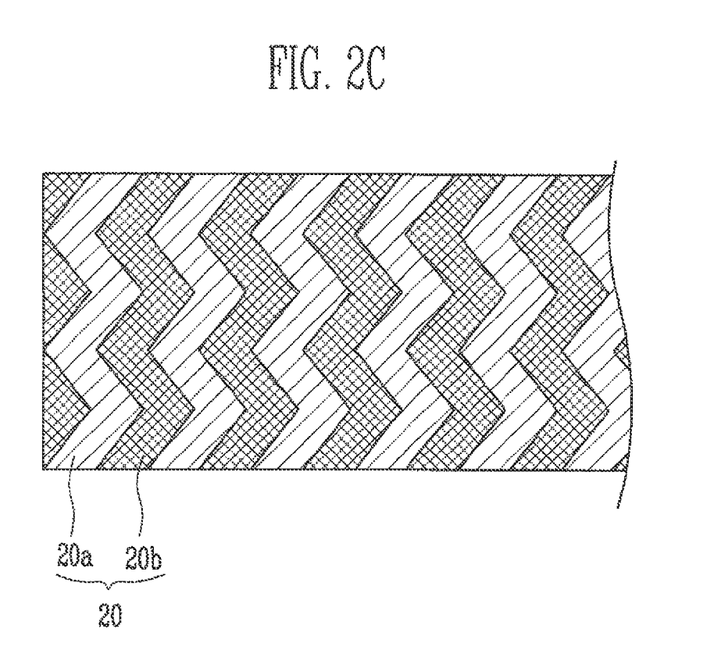
FIG. 2C is a plan view illustrating an intermediate layer having a comb shape of pattern constructed as another exemplary embodiment according to the principles of the present invention.

FIG. 2C is a plan view illustrating an intermediate layer having a comb shape of pattern constructed as another exemplary embodiment according to the principles of the present invention.

Referring to FIG. 2C, in the intermediate layer 20 constructed as another exemplary embodiment according to the principles of the present invention, like the stripe pattern of FIG. 2A, the carbons 20a are formed in a comb shape and with a predetermined interval, and the binder 20b is formed therebetween. That is, the intermediate layer 20 configured by including the carbon 20a and the binder 20b may form patterns having a comb shape formed alternately to each other.

As shown in FIGS. 2A to 2C, the binder is included in the intermediate layer 20, such that deterioration in the performance of the battery can be prevented by using the binder 20b in a known active material slurry. Further, as compared with the case where the binder 20b is included in the active material slurry, when the binder 20b is included in the intermediate layer 20, although the amount of the binder 20b is small, the adhesion between the substrate 10 and the active material layer 30 can be further improved.

Figure 3A:
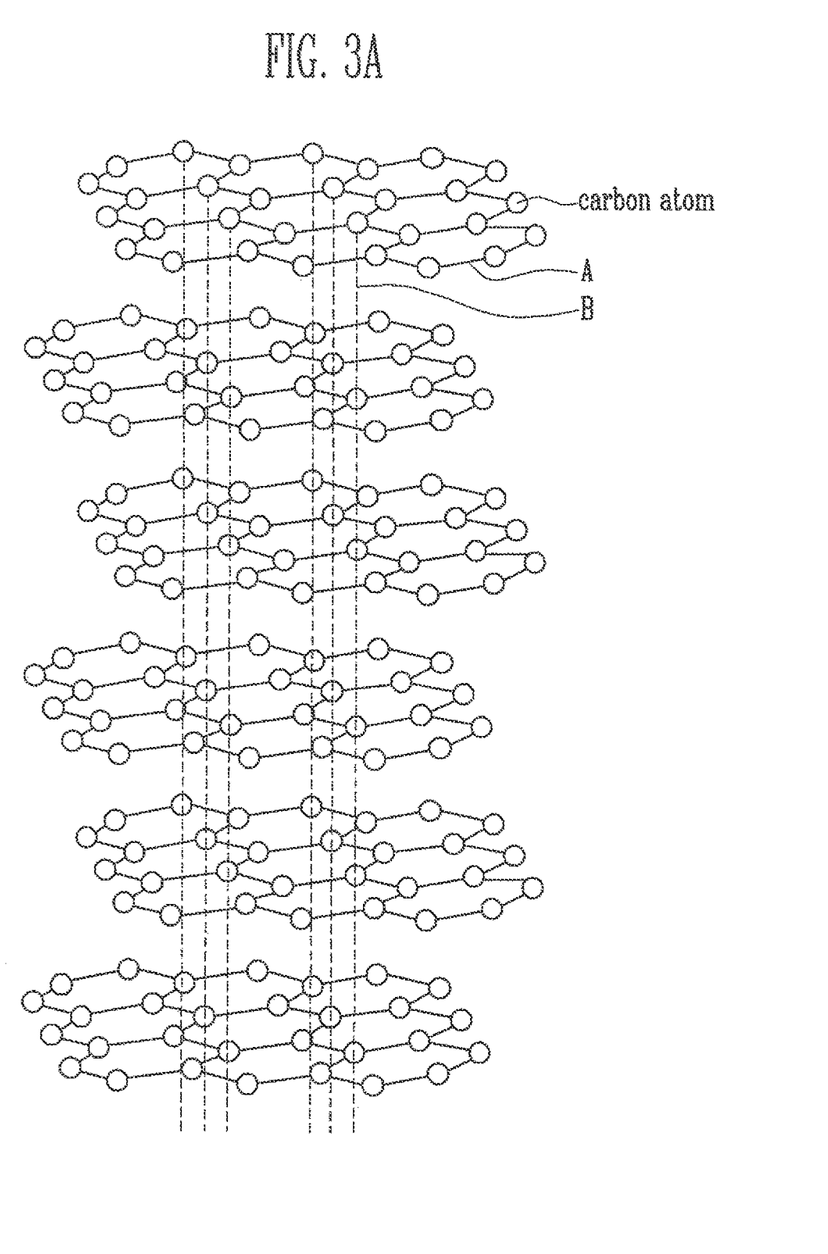
FIG. 3A is a chemical structural formula of graphite.

FIG. 3A is a chemical structural formula of graphite.

Referring to FIG. 3A, the graphite is a hexagonal crystal and has the overlapped shape of plural plate substrates. That is, the graphite structure has the layered shape in which rings having six carbons are connected to each other. Herein, the carbons A in the same layer are connected to each other by a covalent bond and the carbons B in different layers are connected to each other by a weak bonding force.

Figure 3B:
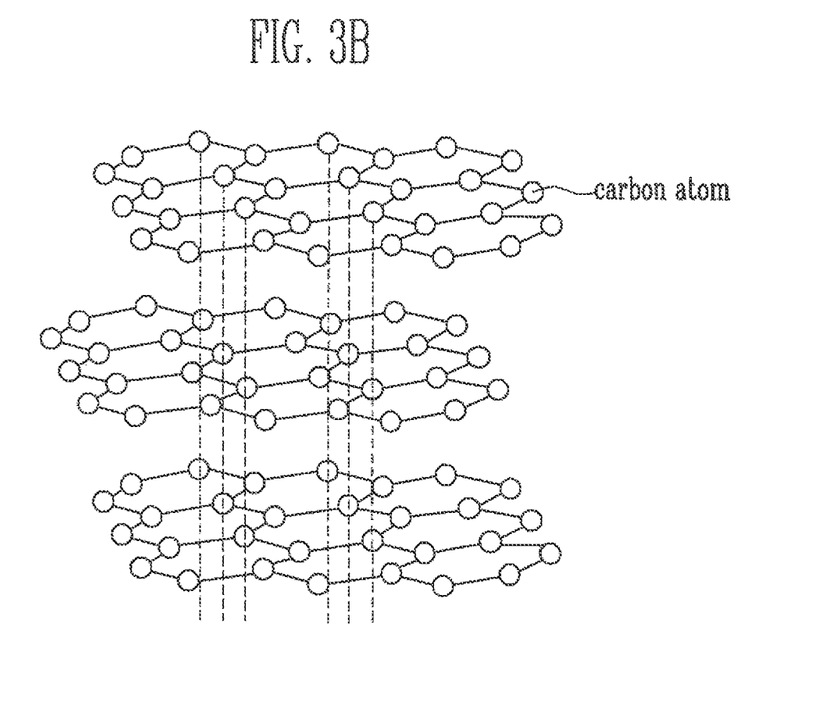
FIG. 3B is a chemical structural formula of a graphene nano sheet.

FIG. 3B is a chemical structural formula of a graphene nano sheet.

Referring to FIG. 3B, the graphene nano sheet has the shape of the plate structure of the graphite of FIG. 3A having the thickness of approximately 5 nm to approximately 50 nm. That is, the graphene nano sheet is formed by disconnecting the bonds between the carbons B between the different layers of the graphite. In the graphene nano sheet, since the thickness is smaller than the thickness of the graphite, the conductivity in the electrode plate and the adhesion between the electrode plates can be increased even by a small amount thereof.

Figure 3C:
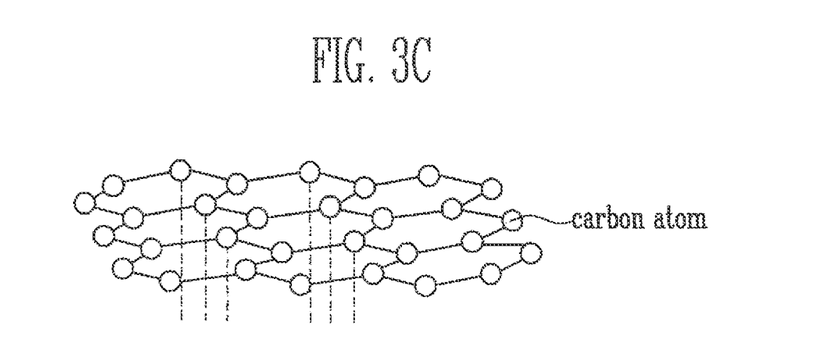
FIG. 3C is a chemical structural formula of graphene.

FIG. 3C is a chemical structural formula of graphene.

Referring to FIG. 3C, the graphene is a combined word in which is made by combining 'graphite' meaning carbon with '-ene' meaning 'unsaturated hydrocarbon'. That is, the graphene is a carbon compound, means one layer of the graphite having the plate structure, and has a two-dimensional shape.

In particular, when the intermediate layer 20 including the graphene nano sheet or the graphene is coated on the substrate 10, a van der Waals force therebetween may be increased. In addition, as a post-process, when the active material layer 30 is coated on the intermediate layer 20, an attraction largely acts even on a contact surface of the active material layer 30 and the intermediate layer 20, thereby increasing the adhesion.

Since the graphene nanosheet or the graphene has a shape of a flat sheet, the contact surface is large. In addition, the graphene may form a flat triangle structure which is a $sp^2$ structure of three sp orbitals configured by one s orbital and two p orbitals.

In Table 1, according to various Examples where the intermediate layer 20 having various shapes is formed between the substrate 10 and the active material layer 30 and a Comparative example where the intermediate layer 20 is not formed between the substrate 10 and the active material layer 30, the adhesions between the substrate 10 and the active material layer 30 were compared with each other.

TABLE 1

| classification | Pattern shape of intermediate layer | Adhesion (gf/mm) |
| --- | --- | --- |
| Example 1 | stripe | 1.3 |
| Example 2 | lattice | 1.6 |
| Example 3 | comb | 1.4 |
| Comparative example | No intermediate layer | 0.4 |

As shown in Table 1, when the intermediate layer 20 is formed between the substrate 10 and the active material layer 30 (Examples 1 to 3), the adhesion between the substrate 10 and the active material layer 30 is further increased, as compared with the case where the intermediate layer 20 is not formed between the substrate 10 and the active material layer 30 (Comparative example). For example, when the intermediate layer having the stripe patterns is formed, the adhesion is 1.3 gf/mm (gram force per milimeter), but when the intermediate layer is not formed, the adhesion is 0.4 gf/mm.

When the intermediate layer is formed, the adhesion between the substrate 10 and the active material layer 30 may be in the range of 0.5 gf/mm to 5.0 gf/mm. Herein, when the adhesion between the substrate 10 and the active material layer 30 is less than 0.5 gf/mm, in a winding process of the electrode plate, an alien substance such as a detachment of the electrode plate and the like is generated, such that safety of a cell may be deteriorated. When the adhesion between the substrate 10 and the active material layer 30 is more than 5.0 gf/mm, the electrode plate is hardened, such that in the winding process, an electrode plate mixture may be broken.

In Examples described above, the pattern shape of the intermediate layer configured by the carbon and the binder was disclosed as the stripe, the lattice, and the comb, but may be formed in various pattern shapes such as an oblique line, a wave, and the like.

Figure 4:
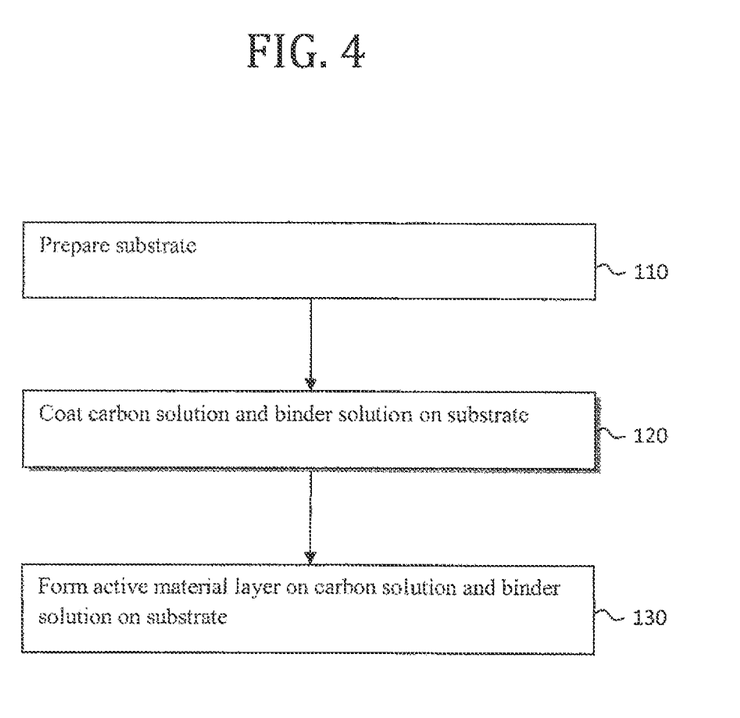
FIG. 4 is a flow chart illustrating a process of manufacturing a secondary battery as still another exemplary embodiment according to the principles of the present invention.

Hereinafter, a method of manufacturing a secondary battery as another exemplary embodiment according to the principles of the present invention will be described. FIG. 4 is a flow chart illustrating a process of manufacturing a secondary battery as another exemplary embodiment according to the principles of the present invention.

First, the method of manufacturing the secondary battery as the exemplary embodiment according to the principles of the present invention prepares a substrate 10 (step 110). In addition, a carbon solution 20a and a binder solution 20b are coated on the substrate 10 in a predetermined pattern (step 120). In this case, the carbon solution 20a and the binder solution 20b may be adjacent to each other. That is, the carbon solution 20a and the binder solution 20b are not mixed. Instead, the carbon solution 20a and the binder solution 20b form a predetermined pattern, and may be coated as one layer. Herein, the carbon solution 20a may be any one selected from a group configured by graphite, graphene nanosheet, and graphene.

The carbon solution 20a and the binder solution 20b may be coated by using a screen print coating method or a spray coating method.

In the screen print coating method, first, a mask selectively transmitted into the carbon solution 20a or the binder solution 20b is prepared. That is, the carbon solution 20a or the binder solution 20b is selectively transmitted through the mask. Next, the mask is disposed on the substrate 10. In this case, a part of the mask is blocked and the rest of the mask is opened. The opened region may be a region through which the carbon solution 20a or the binder solution 20b are transmitted with respect to the predetermined pattern. As a result, the carbon solution 20a or the binder solution 20b is applied by using a roller. Therefore, each of the carbon solution 20a and the binder solution 20b is transferred through the opened region of the mask to the substrate 10 by using the roller. That is, in the screen print coating method, two masks are prepared. Each mask has an open region corresponding to the pattern of a respective one of the carbon solution 20a and the binder solution 20b. First, a first mask is disposed on the substrate 10, and one of the carbon solution 20a and the binder solution 20b is transmitted through the open region of the first mask to the substrate 10. Next, a second mask is disposed on the substrate 10, and the other one of the carbon solution 20a and the binder solution 20b is transmitted through the open region of the first mask to the substrate 10. As a result of the screen print coating method, the carbon solution 20a and the binder solution 20b having the predetermined pattern are formed on the substrate 10 as one layer.

In the spray coating method, a mask corresponding to a pattern of each of the carbon solution 20a and the binder solution 20b is prepared. In addition, the corresponding mask is disposed on the substrate 10 and each of the carbon solution 20a and the binder solution 20b is sprayed. As such, each one of the carbon solution 20a and the binder solution 20b may be coated on only a region on the substrate 10 corresponding to each pattern so as not to be mixed on the substrate 10.

Thereafter, the active material layer 30 is formed on the intermediate layer 20 coated with the carbon solution 20a and the binder solution 20b (step 130). The secondary battery as another exemplary embodiment according to the principles of the present invention may be manufactured by the method described above.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and-equivalents thereof.

What is claimed is:

1. A secondary battery, comprising:
   (a) a substrate, which includes a current collector;
   (b) an intermediate layer comprising carbon and a binder disposed on the substrate; and
   (c) an active material layer disposed on the intermediate layer,
   wherein said carbon and binder in the intermediate layer are not mixed together,
   wherein said carbon and binder in the intermediate layer are each disposed in a plurality of striped shapes, wherein each striped shape in said plurality of striped shapes is in direct contact with the adjacent striped shape and alternates in composition between carbon and binder, and
   wherein each striped shape of carbon and binder is adjacent to both the substrate and active material layer.

2. The secondary battery of claim 1, wherein the carbon includes one selected from graphite, a graphene nano sheet, or graphene.

3. The secondary battery of claim 1, wherein the adhesion between the substrate and the active material layer disposed on the substrate is in the range of approximately 0.5 gf/mm to approximately 5.0 gf/mm.

4. The secondary battery of claim 1, wherein a thickness of the intermediate layer is in the range of approximately 0.2 μm to approximately 5 μm.

5. The secondary battery of claim 1, wherein the carbon includes amorphous carbon.

6. The secondary battery of claim 1, wherein the substrate includes a positive current collector.

7. The secondary battery of claim 1, wherein the binder includes at least one selected from PVDF (polyvinylidene fluoride), PI (polyimide), PAI (polyamideimide), chitosane, or SBR (styrene-butadiene rubber).

* * * * *